Feb. 1, 1955
M. LEICHSENRING
2,701,035
BRAKE HOLDER FOR AUTOMOTIVE VEHICLES AND CONTROL MEANS THEREFOR
Filed June 22, 1953
2 Sheets-Sheet 2
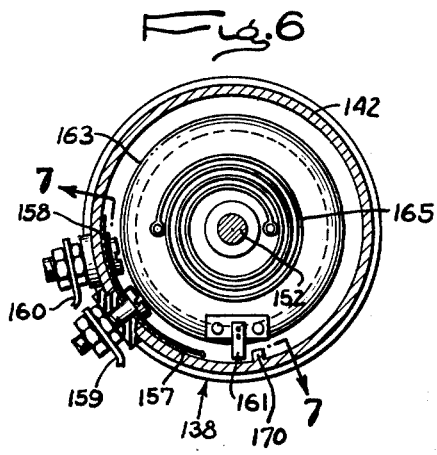
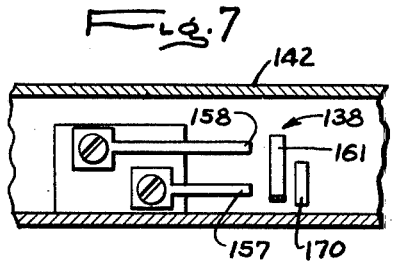
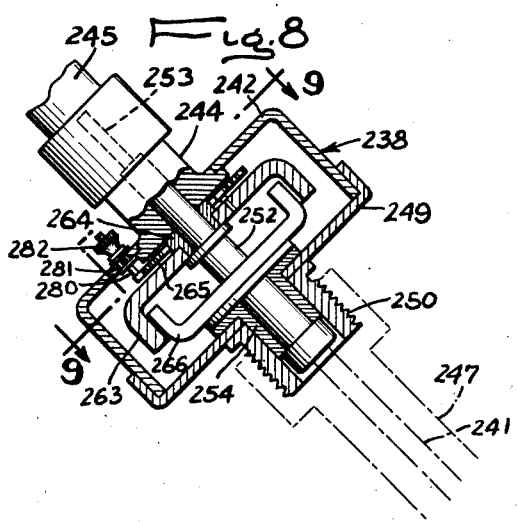
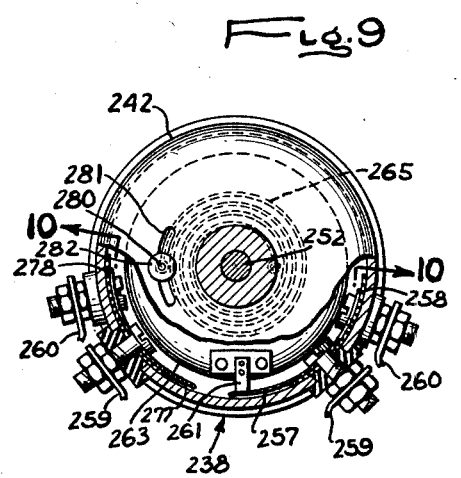
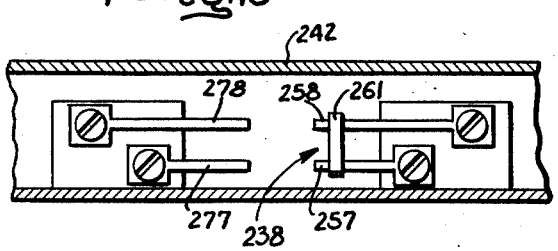
INVENTOR
Max Leichsenring
by: Carlson, Pitzner, Hubbard & Wolfe
ATTORNEYS United States Patent Office 2,701,035
Patented Feb. 1, 1955

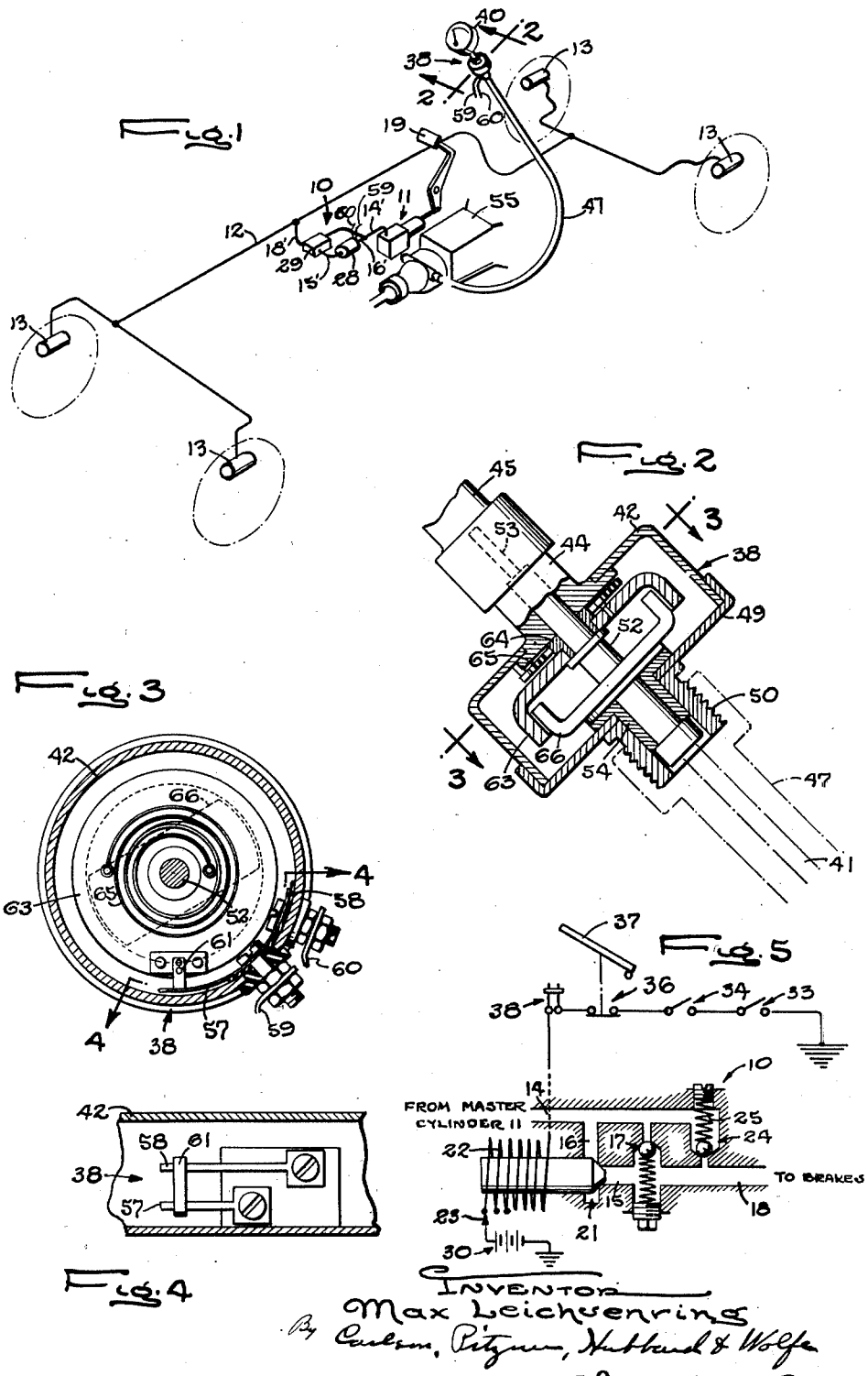

2,701,035

BRAKE HOLDER FOR AUTOMOTIVE VEHICLES AND CONTROL MEANS THEREFOR

Max Leichsenring, Chicago, Ill.

Application June 22, 1953, Serial No. 363,343

8 Claims. (Cl. 188—152)

The present invention relates to a brake holder and control means therefor, the holder including a valve system adapted to be interposed in the hydraulic brake system of an automotive vehicle for holding the brakes in applied condition while the vehicle is standing.

The present application is a continuation-in-part of co-pending application Serial No. 211,517 filed February 17, 1951, now abandoned.

One object of the invention is to provide a brake holder of the character recited which is adapted to be incorporated as an accessory in a standard automotive vehicle without signficant modification of any of the existing components of the vehicle.

Another object is to provide an improved control arrangement for a brake holder which is operable to disable the holder when the vehicle is in motion. More particularly it is an object to provide an improved control means of this character which is certain and dependable in operation.

A further object lies in the provision of an improved control switch responsive to vehicle motion and adapted to be quickly and easily installed in conventional vehicles. A related object is to provide an improved control switch means which is not only effective to maintain the holder in disabled condition while the vehicle is in motion but additionally is constructed and arranged to effect auxiliary circuit control.

The objects of the invention thus generally set forth, together with other objects and ancillary advantages are attained by the construction and arrangement shown by way of illustration in the accompanying drawings, in which:

Figure 1 is a partially diagrammatic view illustrating the manner in which the brake holder is incorporated in a conventional motor vehicle.

Fig. 2 is a sectional view taken substantially in the plane of line 2—2 in Fig. 1 and showing one form of control switch arrangement.

Fig. 3 is a sectional view taken substantially in plane of line 3—3 in Fig. 2.

Fig. 4 is a fragmentary sectional view taken substantially along the line 4—4 in Fig. 3.

Fig. 5 is a diagrammatic view showing the brake-holder valve arrangement and an electrical control circuit therefor.

Fig. 6 is a transverse sectional view similar to Fig. 3 but showing a modified form of the invention.

Fig. 7 is a fragmentary section taken substantially along the line 7—7 in Fig. 6.

Fig. 8 is a central longitudinal section similar to Fig. 2 but showing another modified form of the invention.

Fig. 9 is a transverse section taken substantially in plane of line 9—9 in Fig. 8.

Fig. 10 is a fragmentary sectional view taken substantially along line 10—10 in Fig. 9.

While the invention is susceptible of various modifications and alternative constructions, there are shown in the drawings and will hereafter be described in considerable detail the preferred embodiments, but it is to be understood that it is not thereby intended to limit the invention to the specific forms disclosed, but it is intended to cover all modifications and alternative constructions falling within the spirit and scope of the invention as expressed in the appended claims.

Brake holders of the type to which the present invention relates are intended to automatically maintain the brakes of an automotive vehicle in an applied condition while the vehicle is standing once the vehicle has been brought to a standstill through the use of the brakes. Because of the prolonged braking action which is attained through the operation of the holder, operation of the vehicle is simplified to a considerable degree. In instances where the vehicle is halted on an incline there is no necessity for continued pressure on the brake pedal in order to prevent the vehicle from rolling down the incline. Where the holder is used in vehicles having automatic, fluid-type transmissions the brakes are maintained in applied condition when the vehicle is standing so as to overcome the tendency of the vehicle to creep forward under the influence of the fluid connection between the engine and the drive wheels.

For illustrative purposes the holder shown in the accompanying drawings is adapted for use in vehicles having hydraulic brake systems. As shown in Fig. 1, it comprises a valve system 10 interposed between the master cylinder 11 of the brake system and the brake fluid line 12 leading to the brake wheel cylinders 13. The system of valves 10 is so designed that pressure fluid from the master cylinder flows freely through the valve system to the wheel cylinders 13 to check or stop the vehicle. In the event that the vehicle is brought to a full stop and only then the valve system traps pressurized fluid in the wheel cylinders 13 and the fluid lines leading thereto so as to maintain the brakes in applied condition while the vehicle remains standing. It will be seen, however, that the valve arrangement 10 is provided with controls which are interconnetced to the power controls of the vehicle in a manner whereby certain valve conduits are opened and the brakes are automatically released as an incident to the reapplication of motive power to the vehicle driving wheels to effect movement thereof.

The operation of the valve system 10 is best understood from the schematic illustration of the valves and valve conduits shown in Fig. 5 taken in connection with the diagrammatic layout comprising Fig. 1. Continuous communication between the master cylinder 11 and the wheel cylinders 13 is provided. Fluid entering the conduit 14 from the master cylinder 11 can always pass through a check valve 17 to a conduit 18 leading to the wheel cylinders 13. When brake applying force on the brake pedal 19 is reduced the fluid pressure in the conduit 14 is reduced and there is a tendency for a certain amount of the fluid to return to the master cylinder 11 from the conduit 18 and thereby release the brakes. Provision is made for selectively blocking the return flow of fluid through the valve system 10 in order to bring about the desired brake holding action. This is effected by means of a valve 21 interconnected between conduits 18 and 14 by way of conduits 15 and 16. As shown, the valve 21 is of the normally open type and is arranged to be closed by means of a solenoid 22. When the solenoid is deenergized the valve 21 is open and wheel cylinder fluid from conduit 18 can flow freely through the valve to the conduit 14. When the solenoid 22 is energized the valve 21 is forced into closed position and traps pressurized fluid in the line 12 and in the wheel cylinders 13 to maintain the brakes in applied condition.

Since the fluid forced into the wheel cylinders 13, when braking force is applied to the brake pedal 19, may be much greater both in volume and in pressure than that required to maintain the vehicle in standing position, even on an incline, provision is made for permitting excess fluid to return to the master cylinder. For this purpose a relief valve 24 is provided intermediate the ends of a bypass line interconnected between the conduits 18 and 14. The instant valve 24 is similar in construction to a conventional ball-check valve but it is biased toward closed position by an adjustable compression spring 25 which is of sufficient strength to cause the valve to close when fluid pressure in the line 18 has dropped to a level desired for brake-holding purposes as determined by tension adjustment of the spring 25. Alternatively, the pressure of the fluid trapped in the lines for brake-holding purposes can be regulated by adjusting the strength of the solenoid 22. Since the solenoid must overcome the pressure of the fluid in the conduit 18 on the valve 21 in order to close the valve, the solenoid, when properly regulated in strength, will not close the valve until the pressure has dropped to the desired level. In the present instance solenoid 22 is regulated in strength through the adjustment of one of its electrical terminals 23 to vary the effective number of its turns which are energized when the solenoid circuit is closed.

The brake holder valve system 10 including the valves and the conduits shown in Fig. 5 may be fabricated as an integrated unit with all the valve elements included in a single body in much the same manner as indicated diagrammatically in Fig. 5. Alternatively, the valve units may be disposed in separate casings as indicated at 28 and 29 in Fig. 1. In this instance, valve 21 with its solenoid operator 22 is contained within the casing 28 and the check valve 17 and relief valve 24 are formed within the casing 29. As shown, casings 28 and 29 are interconnected by suitable conduits 14', 15', 16', and 18' to form the valve system. The conduits designated by the reference numerals with the addition of prime marks in Fig. 1, correspond to the conduits designated with the same reference numerals but without the prime marks in Fig. 5.

It will be understood that brake-holder valve system 10 may be varied from the specific construction disclosed without changing the essential brake-holding action of the system. In the first of the illustrative forms this action is produced only when the solenoid 22 is energized to trap brake fluid in the wheel cylinders and in the lines leading thereto. When the solenoid is deenergized, the brake-holding system is disabled and has no effect on the braking system.

The electrical circuit for controlling the solenoid 22 is also diagrammatically shown in Fig. 5. The adjustable terminal 23 of the solenoid 22 is connected to the vehicle battery 30 and the other solenoid terminal is grounded through a series of switches to complete the electrical circuit through the solenoid. In the series of switches shown, a first switch 33 is included which represents the conventional vehicle ignition switch. This, of course, is opened when the engine is cut off. In this manner it is assured that the solenoid circuit does not remain closed to discharge the battery when the vehicle is not in use. A second switch 34 is included which may be disposed on the vehicle dash or in any other accessible location and is manually operable to prevent operation of the brake-holding system at any time when its action is not desired. The third switch 36 is connected to one of the power controls of the vehicle such as the accelerator pedal 37 and is opened to interrupt the solenoid circuit when the power control is shifted in position in the course of setting the vehicle into motion. This, in turn, permits the valve 21 to open, dumping fluid from the wheel cylinders 13, so as to automatically release the brakes. A fourth switch 38 is provided in the circuit for holding the circuit open and thus disabling the brake holder when the vehicle is in motion. Thus the valve 21 is maintained in open position until the vehicle is brought to a halt. It is only at this time that the holder has any effect on the braking system of the vehicle.

A particularly important feature of the present invention comprises the construction and arrangement of the switch 38 which is used to maintain the brake holder in disabled condition while the vehicle is in motion. The switches used for this purpose in the past have been subject to numerous shortcomings which are effectively overcome by the instant switch. Moreover, prior switches have in some instances required special design or substantial modification of the vehicle parts to permit their accommodation. For this reason, it has been generally impractical heretofore to provide vehicles with brake holders of this general type along with the necessary control means therefor unless the vehicles have been especially designed to receive the added parts. The control switch 38 constructed and arranged in accordance with the present invention, however, is especially adapted to be quickly and easily installed in an automotive vehicle of standard design without the necessity for modification of any of the existing vehicle parts.

As shown in Figs. 1 and 2, the present switch 38 is adapted to be interposed between a conventional vehicle speedometer 40 and a conventional drive cable 41 for the speedometer. The working parts of the switch are disposed within a housing comprising an annular cup-shaped casing 42. In the present instance a separately formed journal sleeve 44 is disposed within a central aperture in the base of the casing 42 and extends outwardly from the casing. The free end of the journal sleeve 44 is adapted to be securely attached to the speedometer cable coupling boss 45 conventionally provided on the rear side of the standard speedometer 40. The attachment is made in the same manner that the guide sheath 47 of the speedometer cable 41 is normally attached to the boss. The switch casing 42 is closed by a coverplate 49 which is provided with an extension 50 on its rear face. The extension 50 is generally similar in construction to the speedometer coupling boss 45 and is axially alined with the journal sleeve 44 on the switch casing 42. By reason of this design the guide sheath 47 of the speedometer cable 41 can be readily attached to the casing extension 50 in the same manner as it is ordinarily attached to the speedometer boss 45.

To drive the speedometer 40 with the switch 38 coupled thereto, the latter is provided with a coupling shaft 52, the forward end of which is journaled in the casing sleeve 44. The extreme forward end of the shaft 52 is provided with a male coupling member 53 similar to that provided on the driving end of the speedometer cable 41. At the time the journal sleeve 44 is attached to the speedometer coupling boss 45 the member 53 is fitted into driving relationship with a female coupling member disposed within the boss 45 and originally designed to receive the driving end of the speedometer cable. Adjacent its rear end, the coupling shaft 52 is journaled in a bushing 54. The extreme rear end of shaft 52 is provided with a female socket which is adapted to receive the male coupling member that is conventionally provided on the driving end of the speedometer drive cable 41. Coupling of the speedometer cable to the shaft 52 is of course effected when the cable shaft 47 is attached to the extension 50.

In the present instance, the disabling switch 38 is so constructed and arranged that the electrical circuit through the switch to the solenoid 22 is interrupted when the coupling shaft 52 is rotated by the vehicle transmission 55 through the speedometer cable 41. As shown in Figs. 2, 3, and 4, magnetic coupling is utilized to the end that the switch contacts are opened upon rotation of the coupling shaft 52 to break the solenoid circuit. Referring particularly to Figs. 3 and 4, it will be seen that a pair of contacts 57 and 58 are provided on the inner wall of the casing 42 which are connected with the solenoid circuit by leads 59 and 60. The contacts are adapted to be bridged to close the circuit by a movable contact member 61. The member 61 is mounted on a cup-shaped metal member or follower 63 which in turn is supported for free rotation on the shaft 52 by means of a bearing 64 (Fig. 2). A biasing torque is applied to the follower 63 by means of a light spiral spring 65 interconnected between the follower and the casing 42. When the shaft is not moving the force of the spring 65 maintains the follower in a rest position, as indicated in Fig. 3, so as to cause the contact member 61 to close the solenoid circuit. To rotate the follower 63 from this rest position, and thus interrupt the solenoid circuit established by way of the contacts 57, 61, and 58, upon rotation of the shaft 52, an elongated permanent magnet 66 is mounted on the shaft 52 for rotation with it. As shown, the opposite ends of the magnet 66, which are of opposite polarity, are bent into substantial perpendicular relation to the body of the magnet and are disposed in closely-spaced relation to the cylindrical sides of the cup-shaped follower member 63. Thus, when the magnet is rotated upon rotation of the shaft 52 eddy currents are set up in the follower 63. These eddy currents in turn produce an interplay of magnetic forces between the follower and the magnet which tend to cause the follower to move in the direction of rotation of the magnet. As previously noted the biasing force of the spring 65 is small and thus it is easily overcome by these magnetic forces. As a result, follower member 63 is immediately displaced from its rest position and the movable contact member 61 is disengaged from the stationary contacts 57 and 58 so as to interrupt the solenoid circuit when the shaft 52 and the magnet 66 begin to rotate. The angular displacement of the follower member 63 effected by the rotating magnet 66 is limited, however, by the counter-torque of the spring 65. In this instance, the extent of the displacement of the follower member 63 is relatively immaterial so long as it is sufficient to disengage the contact member 61 from bridging-engagement with the contacts 57 and 58 while the shaft 52 is rotated.

It will be apparent that in this manner the electrical circuit through the solenoid 22 is kept open while the vehicle is in motion and the brake holder is rendered ineffective so as not to interfere with the normal operation of the motor vehicle, including normal application and release of its brakes. However, once the vehicle is brought to a standstill and the speedometer cable 41 and shaft 52 stop rotating, the switch 38 closes and the brake holder becomes effective to maintain the brakes in applied condition so as to keep the vehicle stopped.

As previously pointed out, the valve 21 chosen for illustration is of the type which is normally open and is closed upon energizing the solenoid 22. If desired a valve similar to the valve 21 but which is normally biased into closed position and arranged to be opened upon energizing its solenoid can be employed if desired. In this case, a motion responsive switch which effects circuit closing when the vehicle is in motion would be required. Such a switch is illustrated in Figs. 6 and 7 of the drawings. As shown, this switch is similar in construction to that previously described and illustrated in Figs. 2, 3 and 4. More specifically, however, the valve solenoid circuit controlling contacts thereof have been reversed in position so that the fixed contacts thereof are bridged when the vehicle is in motion and the circuit is interrupted when the vehicle is brought to a standstill.

Since in major part the elements of this modified form of switch are substantially the same as those in the first form illustrated and described, to simplify the description thereof similar reference numerals with the addition of a prefix "1" have been used to designate the various parts, e. g. in the first form the follower is designated "63" and in the instant form the follower is designated "163."

Referring more particularly to Figs. 6 and 7, it will be there seen that the casing 142 is equipped with a pair of stationary contacts 157 and 158 which are adapted to be bridged by a movable contact member 161 carried by a follower 163, the latter being mounted for free rotation on a centrally-disposed coupling shaft 152. Fixed on the shaft 152 for rotation therewith is a permanent magnet 166. The magnet 166 and the follower 163 operate in the same manner as the magnet 66 and the follower 63 of the first form illustrated to produce movement of the contact member 161. This form of the motion responsive switch, too, is equipped with a return spring 165 which is effective to bias the follower 163 toward its rest position as determined by a stop 170 rigid with the casing 142.

In operation, therefore, upon rotation of the coupling shaft 152 by the speedometer drive the follower 163 tends to move in direction of rotation of the magnet 166 to the end that the movable contact member 161 is moved from its rest position into a position wherein it bridges the contacts 157 and 158 thus establishing a circuit through the switch 138.

It has been found desirable in certain applications to provide in the control systems switch means, in addition to that such as afforded by the switches 38 and 138 of the preceding forms illustrated, as for example to control other equipment with which the vehicle may be equipped and which are desirably controlled in the same manner as the brake holding system. Control switches of the type forming a part of the present invention permit the incorporation of additional contacts which may be utilized for such auxiliary circuit control. Referring more particularly to Figs. 8, 9, and 10, there shown is a modified form of switch substantially like that illustrated in Figs. 2, 3, and 4, but incorporating an additional set of contacts which are adapted to be bridged by the same actuator which bridges the contacts for the brake holder circuit. Since the majority of the components of this modified form of switch are substantially identical with those of the first form of the invention shown, similar reference characters with the prefix "2" are utilized so as to simplify the description thereof, e. g. the casing is designated "242."

This illustrative switch, which includes the casing 242, also includes a coupling shaft 252 mounting a permanent magnet 266 for rotation therewith, and rotatably supporting a follower member 263. The latter is adapted to be moved in response to the interplay of magnetic forces resulting from the rotation of the magnet 266. The follower is normally biased toward rest position by means of a spring 265. This switch 238 includes a pair of fixed contacts 257 and 258 which are adapted to be bridged by a movable contact member 261 carried by the follower 263 when the latter is in rest position.

Additionally, the switch 238 is equipped with a pair of auxiliary contacts 277 and 278 which are mounted on the cylindrical wall of the housing 242 of the switch in angularly-spaced relation with respect to the contacts 257 and 258. The contacts 277 and 278 are held in place on the casing by means of conventional terminal screws which extend exteriorly of the casing 244 for the accommodation of suitable leads 259 and 260 for incorporation in an auxiliary electrical circuit. Upon reference to Figs. 9 and 10, it will be there seen that when the vehicle in which the switch 238 is installed is at a standstill, by the action of the biasing spring 265 on the follower 263, the movable contact member 261 is in its rest position wherein it bridges the contacts 257 and 258. Upon operation of the power controls of the vehicle to set the same in motion, the magnet 266 is rotated causing angular movement of the follower 263 against the action of the spring 265. As a result the movable contact member 261 is disengaged from the contacts 257 and 258, and is moved toward a position wherein it bridges the contacts 277 and 278. It is apparent, therefore, that there is provided within a single switch mechanism, which is readily inserted in the speedometer drive mechanism of a conventional vehicle without the necessity for alteration thereof, switch means for sequentially controlling more than just a single circuit—two in the illustrative form.

An additional modification has been incorporated in the form of the invention shown in Figs. 8 through 10, inclusive. It has been found desirable in some instances to provide means for adjusting the tension of the return spring for the follower member of the switch mechanism so as to permit adjustment of the biasing torque effected upon the follower member of the switch. Thus as shown in the drawings a pin-in-slot adjustment is provided, which includes a pin 280 received in an arcuate slot 281 formed in the transverse end portion of the housing 242. The outer end of the biasing spring 265 is attached to the inner end of the pin 280 and the outer end of the pin 280 is equipped with a clamping nut 282 by means of which the position of the pin 280 with respect to the slot can be determined. From Fig. 9 it will be seen that movement of the pin in a counterclockwise direction along slot 281 serves to increase the tension of the spring 265, and conversely, movement thereof in a clockwise direction serves to decrease tension therein and thus the force exerted thereby on the follower 263.

The working parts of each of the illustrative switches are of exceedingly simple form permitting of economical manufacture, not subject to undue wear. Further advantages are realized from the ability of the switch to remain certain and dependable in operation even after long periods of use. It will be appreciated that the brake holder valve system may be easily installed in any conventional fluid brake system. The brake holder control switches 33, 34, and 36 may also be installed without difficulty. Assembly of the motion-responsive switches into the speedometer drive, too, is a very simple matter. The switch is connected to the speedometer in the same manner as the speedometer cable is normally and directly connected to the speedometer, and the speedometer cable is in turn connected to the switch just as it would otherwise be connected to the speedometer. It is apparent, therefore, that no substantial modification of the vehicle parts is required for the installation of the brake holder and thus the instant device is especially adapted to be used in automotive vehicles which are not specifically designed for brake holders. Accordingly, therefore, brake holders embodying the instant invention find extensive utility in both new and old vehicles.

I claim as my invention:

1. A brake holder for an automotive vehicle having a fluid brake system, a speedometer, and a rotary speedometer drive, said holder comprising, in combination, a valve system adapted to be interposed in the vehicle brake system, said valve system including a check valve for permitting one-way fluid flow therethrough and a second valve for permitting a return fluid flow therethrough, a solenoid connected to said second valve and operable to selectively close said second valve, a switch associated with said solenoid for controlling an electrical circuit to the solenoid to selectively open and close said second valve, said switch comprising a housing adapted to be interposed in the vehicle speedometer drive, a coupling shaft in said housing for driving the vehicle speedometer through said switch, a permanent magnet mounted on said shaft for rotation therewith, an annular follower mounted for free rotation on said shaft and having certain parts thereon disposed in proximity to opposite poles of said magnet, said follower being formed of metal whereby it is influenced by the magnetic forces of said magnet to be urged rotatably in the direction of rotation of said magnet, a light spring interconnecting said follower and said housing for moving said follower into a rest position when said magnet is at rest, cooperating electrical contacts on said housing and said follower for closing the solenoid circuit when said follower is in said rest position, said magnet serving upon rotation thereof to displace said follower from said rest position to break the solenoid circuit for opening said second valve.

2. For use in a automotive vehicle having a speedometer, a speedometer cable for driving the speedometer, a hydraulic brake system, a valve system interposed in the brake system for retaining the latter in applied condition, and a solenoid interconnected with the valve system in controlling relation thereto, a control device for the solenoid comprising, in combination, a frame having opposite ends thereon, one of said frame ends being adapted for connection to the vehicle speedometer, the other of said frame ends being adapted for connection to the vehicle speedometer cable, a rotary coupling shaft extending longitudinally through said frame and piercing opposite ends thereof, said shaft being adapted to serve as an intermediate element for driving the speedometer from the speedometer cable, a magnet mounted on said shaft for rotation therewith, a metallic follower rotatably mounted on said frame in proximity to said magnet, biasing means interconnected with said follower for urging the latter into a rest position, and cooperating electrical contacts on said housing and said follower and adapted to close an electrical circuit through the brake valve solenoid when said follower is in said rest position, said magnet being operable upon rotation of said shaft to displace said follower from rest position.

3. For interposition in the driving transmission of a vehicle speedometer, a motion responsive electrical control device comprising, in combination, a housing having opposite ends thereon, a rotatable coupling shaft extending longitudinally through said housing and piercing said opposite ends thereof, a permanent magnet in said housing fixed to an intermediate portion of said shaft for rotation therewith, a rotary metallic follower journaled within said housing in proximity to said magnet, a light spring interconnected between said housing and said follower and biasing the latter toward a rest position, and circuit controlling electrical contacts positioned on said housing and said follower respectively for mutual engagement when said follower is in said rest position, said magnet upon rotation thereof being operable to displace said follower from said rest position, thus separating said contacts.

4. For interposition in the driving transmission of a vehicle speedometer, a motion responsive electrical control device comprising, in combination, a housing having opposite ends thereon, a rotatable coupling shaft extending longitudinally through said housing and piercing said opposite ends thereof, a permanent magnet in said housing fixed to an intermediate portion of said shaft for rotation therewith, a rotary metallic follower journaled within said housing in proximity to said magnet, a light spring interconnected between said housing and said follower and biasing the latter toward a rest position, and circuit controlling electrical contacts positioned on said housing and said follower respectively and having engaged and disengaged positions with one of said positions corresponding to the rest position of said follower, said magnet upon rotation thereof being effective to displace said follower from said rest position and thus to correspondingly move said contacts from one position into the other.

5. For interposition in the driving transmission of a vehicle speedometer, a motion responsive electrical control device comprising, in combination, a housing having opposite ends thereon, a rotatable coupling shaft extending longitudinally through said housing and piercing said opposite ends thereof for connection with the speedometer and the drive therefor, a permanent magnet in said housing fixed intermediate the ends of said shaft for rotation therewith, a rotary metallic follower journaled within said housing in proximity to said magnet, a spring interconnected between said housing and said follower and biasing the latter toward a rest position, means for adjusting the tensioning of said spring and circuit controlling electrical contacts positioned on said housing and said follower respectively and having engaged and disengaged positions with one of said positions corresponding to the rest position of said follower, said magnet upon rotation thereof being effective to displace said follower from said rest position and thus to correspondingly move said contacts from one position into the other.

6. For interposition in the driving transmission of a vehicle speedometer, a motion responsive electrical control device comprising, in combination, a housing having opposite ends thereon, a rotatable coupling shaft extending longitudinally through said housing and piercing said opposite ends thereof, a permanent magnet in said housing fixed to an intermediate portion of said shaft for rotation therewith, a rotary metallic follower journaled within said housing in proximity to said magnet, an electrical contact member on said follower, a spring interconnected between said housing and said follower and biasing the latter toward a rest position, means for adjusting the tensioning of said spring, circuit controlling electrical contact means positioned on said housing in angularly spaced relation to the rest position of said follower contact member, said magnet upon rotation thereof being effective to displace said follower from said rest position and thus to correspondingly move the contact member thereon from its rest position into engagement with the contact means on said housing.

7. For interposition in the driving transmission of a vehicle speedometer, a motion responsive electrical control device comprising, in combination, a housing having opposite ends thereon, a rotatable coupling shaft extending longitudinally through said housing and journaled in the opposite ends of said housing, a permanent magnet in said housing and mounted intermediate the ends of said shaft for rotation therewith, a rotary metallic follower journaled within said housing in proximity to said magnet, a spring interconnected between said housing and said follower and biasing the latter toward a rest position, and sets of circuit controlling electrical contacts positioned in angularly spaced relation on said housing, and a contact member on said follower, one of said sets of contacts being located for engagement by said contact member in the rest position of said follower, said magnet upon rotation thereof being effective to displace said follower from said rest position and to correspondingly move said contact member out of engagement with said one set of contacts and toward engagement with another of said sets of contacts.

8. A motion responsive electrical control device comprising, in combination, a housing, a rotatable shaft journaled in said housing, means for rotating said shaft, a permanent magnet in said housing and mounted on said shaft for rotation therewith, a rotary metallic follower journaled within said housing in proximity to said magnet, a spring interconnected between said housing and said follower and biasing the latter toward a rest position, sets of circuit controlling electrical contacts positioned in angularly spaced relation on said housing, and a contact member on said follower, one of said sets of contacts being located for engagement by said contact member in the rest position of said follower, said magnet upon rotation thereof being effective to displace said follower from said rest position and to correspondingly move said contact member out of engagement with said one set of contacts and toward engagement with another of said sets of contacts.

References Cited in the file of this patent
UNITED STATES PATENTS

| | | |
|---|---|---|
| 2,125,055 | Taliaferro | July 26, 1938 |
| 2,313,430 | Goepfrich | Mar. 9, 1943 |